Patented Feb. 17, 1953

2,628,931

UNITED STATES PATENT OFFICE 2,628,931

FERMENTATION PROCESS

Thomas D. Nunheimer, Elkton, Va., assignor to Merck & Co., Inc., Rahway, N. J., a corporation of New Jersey No Drawing. Application August 25, 1950, Serial No. 181,581

19 Claims. (Cl. 195—80)

This invention relates to procedures for the production of streptomycin by fermentation of suitable culture media with a streptomycin producing strain of *Streptomyces griseus*. More particularly, the invention relates to improved fermentation procedures wherein the utilization of new mixtures of nitrogenous materials providing a source of nitrogen and streptomycin "activity factor" leads to markedly enhanced yields of streptomycin.

It has been recognized from the time of the earliest publications relating to streptomycin that in the fermentation of nutrient media with the organism *S. griseus*, it is possible to obtain good growth of the organism without obtaining satisfactory yields of streptomycin. In order that a satisfactory yield of streptomycin may be obtained, it is necessary that the medium contain a specific factor of the type present in meat extract or corn steep liquor which stimulates the organism to produce streptomycin during propagation. In a publication by Waksman, Schatz and Reilly appearing in J. Bact., 51, 753 (1946), the term "activity factor" was applied to this unknown streptomycin stimulating factor as a means for differentiating from the term "growth factor" which relates merely to the growth or cell development of the organism.

During the time since the initial publication concerning streptomycin by Schatz, Bugie and Waksman in Proc. Soc. Exptl. Biol. & Med., 55, 66–69 (1944), very few sources of "activity factor" in addition to the corn steep liquor and meat extract originally disclosed have been discovered. Yeast extract has been found to be capable of stimulating streptomycin production, but yeast extract like meat extract is a relatively expensive material for use in large scale production. In British Patent No. 613,469, it has also been disclosed that a number of seed meals, and notably soy bean meal, can be employed as a source of streptomycin "activity factor." In a copending application of my colleagues McDaniel and Hendlin, Serial No. 23,136, filed April 24, 1948, it has also been disclosed that distillers solubles, when associated with a supplemental nitrogen source such as sodium nitrate or an organic nitrogenous complex, can effectively be employed in the production of streptomycin.

While the knowledge concerning nutrient components which are suitable for use in the production of streptomycin has thus been expanded, the exact nature and identity of the compound or combination of compounds which provide the necessary "activity factor" has not yet been determined. Thus it remains wholly impossible to predict what additional nitrogenous materials might be expected to provide a source of this "activity factor." Until the "activity factor" is fully identified, it is impossible to know whether nitrogenous materials presently recognized as providing a source of streptomycin "activity factor" actually constitute the best materials for utilization in the large scale production of streptomycin. Thus the situation presents a real challenge to microbiologists to continue research studies which may make available additional sources of streptomycin "activity factor" and possibly yield additional information useful in the final elucidation of the chemical compound or compounds which constitute this "activity factor."

In the course of such research studies, I have now discovered that surprising and highly advantageous results can be obtained in the production of streptomycin by employing as a source of nitrogen and streptomycin "activity factor" novel combinations of complex organic nitrogenous materials. The basic components of my novel nitrogenous mixtures are corn steep solubles and wheat gluten. Corn steep solubles, or corn steep liquor, is, of course, one of the nitrogenous materials originally employed by Schatz, Bugie and Waksman in the production of streptomycin. Wheat gluten, on the other hand, has not previously been employed, and it is surprising to note that although wheat gluten by itself is wholly ineffective as an agent for stimulating streptomycin production, a combination of wheat gluten and corn steep solubles in a nutrient medium provides a streptomycin yield 30–60% greater than the streptomycin yield in a similar medium, wherein the same total amount of organic nitrogenous material is supplied wholly as corn steep solubles.

While the cooperative or synergistic action exhibited by a mixture of corn steep solubles and wheat gluten provides a new basic medium for use in streptomycin production which has real commercial significance, I have further discovered that by supplementing this medium with additional organic nitrogenous materials and, in particular, with distillers solubles, castor bean meal, or preferably distillers solubles plus castor bean meal, the yield of streptomycin can be stepped up to 2 to 3 times the yield obtained with corn steep solubles as the sole source of organic nitrogenous material. Here again, the stimulating effect of the added distillers solubles and/or the castor bean meal is surprising and unexpected, since these materials by themselves are ineffective as agents for the stimulation of streptomycin production. In this connection, attention is directed to the comparative data presented hereinafter in Example 1.

In my new media, corn steep solubles can be supplied either as the dried corn steep solubles or corn steep liquor. The amounts of this component are hereinafter expressed in terms of the solid content, and for practical purposes I prefer to employ the corn steep liquor.

Wheat gluten is the protein obtained from wheat after removal of the major portion of the starch and bran. It is variously described and sold commercially as "wheat gluten," "gluten wheat," "dry gluten," and "devitalized wheat gluten." Wheat gluten is preferably employed free of other parts of the grain and free of the various materials encountered in processing the grain; however, the whole grain and various liquid and solid products, intermediate fractions, by-products, etc., containing wheat gluten may also be employed if desired, provided no deleterious substances are also present. It has been found that it is only the gluten of wheat that is effective, other wheat products containing no gluten, such as wheat flour middlings, wheat grits, and wheat standard middlings, being ineffective.

Distillers solubles is a proteinaceous by-product of potable alcohol manufactured by the yeast fermentation of grain mashes and when dried generally shows the following proximate analysis: crude protein, 30–33%; crude fat, 10–12%; crude fiber, 3–4%; and ash, 6–7%. The crude protein content of 30–33% may be further broken down approximately as follows: amino acids, 2.5%; yeast protein, 11%; amines and ammonia, 1%; and cereal proteins and peptones, 15%. Distillers solubles and methods employed industrially in its preparation are described by Boruff in Ind. and Eng. Chem., 39, 602 (1947).

The castor bean meal which I employ is the commercially available dried and finely divided meal obtained after removal of the oil from castor beans.

In addition to the new nitrogenous mixtures, my media contain a source of carbon, preferably in the form of an assimilable carbohydrate such as dextrose, glucose, mannose, maltose, dextrin and the like, dextrose being preferred. The medium should also contain a nutrient inorganic salt. While the inorganic salt may be present in sufficient amount in the organic complexes employed, it is preferable to add to the media a small amount of sodium chloride. Other inorganic salts such as potassium chloride, sodium sulfate and sodium nitrate can, if desired, be added.

In the various new media disclosed herein, I employ 1 to 4%, and preferably about 2% of dextrose, and up to 1%, preferably about 0.25% sodium chloride. The relative amounts of complex nitrogenous material vary somewhat, however, depending upon whether a combination of two, three, or four such materials are employed. The preferred range and optimum amounts of the nitrogenous materials in the various mixtures are tabulated below.

*Amounts of nitrogenous material in mixtures of:*

(a) Corn steep solubles+wheat gluten.—
- Corn steep _____ 0.25–1%, preferably 0.5%
- Wheat gluten _____ 0.25–2%, preferably 1.0%

(b) Corn steep solubles+wheat gluten+distillers solubles.—
- Corn steep _____ 0.25–1%, preferably 0.5%
- Wheat gluten _____ 0.25–2%, preferably 1.0%
- Distillers solubles _____ 0.25–1%, preferably 0.75%

(c) Corn steep solubles+wheat gluten+castor bean meal.—
- Corn steep _____ 0.25–1%, preferably 0.5%
- Wheat gluten _____ 0.25–1%, preferably 0.5%
- Castor bean meal _____ 0.25–1%, preferably 0.5%

(d) Corn steep solubles+wheat gluten+distillers solubles+castor bean meal.—
- Corn steep _____ 0.25–1%, preferably 0.5%
- Wheat gluten _____ 0.25–1%, preferably 0.5%
- Distillers solubles _____ 0.25–1%, preferably 0.5%
- Castor bean meal _____ 0.25–2%, preferably 0.5%

In the production of streptomycin in accordance with this invention, my new media are fermented with a streptomycin producing strain of S. griseus, preferably by submerged aerated and agitated fermentation, in accordance with previously known procedures. The selected medium is first adjusted to pH 6.5–7.0 and then sterilized in the usual way, as, for example, by heating to about 120° C. for about 15–30 minutes, and is then inoculated with a vegetative culture of a streptomycin producing strain of S. griseus. The inoculated medium is then incubated at 26–28° C., while maintaining the organism in a submerged aerated state by constant agitation and aeration of the medium. Incubation is continued for a period generally ranging from 3 to 5 days until maximum streptomycin yield is reached, as determined by the conventional cup assay of broth using B. subtilis as the test organism. The fermented medium is then filtered and treated for recovery of streptomycin therefrom in the usual way.

In the following examples which are presented by way of illustration and not of limitation, it is to be noted that the strain of S. griseus employed was the same in each case and the various ingredients, procedures, and conditions were maintained constant except where variations are indicated.

Example 1

The production of streptomycin in a number of different media was compared. In each case, 40 ml. of medium was placed in a 250 ml. flask and adjusted to pH 6.5–7.0. The flask was plugged with cotton and sterilized by autoclaving at 120–122° C. for 15 minutes. Each flask was then inoculated with a 24-hour vegetative culture of a streptomycin producing strain of S. griseus. The flasks were then maintained at 26–28° C. on a rotary shaking machine for 4 days. Samples were taken during this period and assayed by the conventional cup assay using B. subtilis as the test organism. The media (water not shown but added to 100% in each case) and the maximum activities obtained are tabulated below:

| Medium No. | NaCl, Percent | Dextrose, Percent | Corn Steep Solubles, Percent [1] | Distillers' Solubles, Percent | Castor Bean Meal, Percent | Wheat Gluten, Percent | Maximum Activity, u./ml.[2] |
|---|---|---|---|---|---|---|---|
| 1  | 0.25 | 2 | 1.5 |      |      |     | 415 |
| 2  | 0.25 | 2 |     | 0.5  |      |     | <100 |
| 3  | 0.25 | 2 |     |      | 0.5  |     | <150 |
| 4  | 0.25 | 2 |     |      |      | 1   | <100 |
| 5  | 0.25 | 2 | 1.5 | 1.5  |      |     | 300 |
| 6  | 0.25 | 2 |     | 1.5  | 0.5  |     | 215 |
| 7  | 0.25 | 2 |     |      | 0.5  | 0.5 | <150 |
| 8  | 0.25 | 2 | 1   |      |      | 0.5 | 570 |
| 9  | 0.25 | 2 |     | 1    |      | 1   | 300 |
| 10 | 0.25 | 2 | 0.5 | 0.75 |      | 1   | 935 |
| 11 | 0.25 | 2 |     | 0.75 |      | 1   | 265 |
| 12 | 0.25 | 2 | 0.5 |      |      | 1   | 640 |
| 13 | 0.25 | 2 | 0.5 | 0.5  | 0.5  | 0.5 | 1,200 |
| 14 |      | 2 | 0.5 | 0.5  | 0.5  | 0.5 | 825 |
| 15 | 0.25 | 2 | 0.5 | 0.5  | 0.5  |     | 380 |
| 16 | 0.25 | 2 | 0.5 |      | 0.5  | 0.5 | 1,100 |

[1] Based on total solids present.
[2] 1 u. = 1 microgram of streptomycin base.

In the same manner, the meat extract medium of Waksman was compared. The medium contained 0.5% NaCl, 1% dextrose, 0.5 peptone, 0.5 meat extract and water to 100%, and the maximum activity produced was 350 u./ml.

The foregoing data indicates a number of significant facts, as for example, distillers solubles, castor bean meal and wheat gluten when used individually lead to very poor streptomycin production, indicating that these materials separately do not foster good streptomycin production. The data further indicates that combinations of the nitrogenous materials which do not include both corn steep solubles and wheat gluten produce yields of streptomycin lower than the yield obtained with corn steep solubles alone. In particular, however, attention is directed to the data presented for media No. 1, 8, 10, 12, 13, and 16 which are partially retabulated below:

| Medium No. | Corn Steep Solubles, Percent | Wheat Gluten, Percent | Distillers' Solubles, Percent | Castor Bean Meal, Percent | Yield |
|---|---|---|---|---|---|
| 1  | 1.5 |     |      |     | 415 |
| 8  | 1.0 | 0.5 |      |     | 570 |
| 12 | 0.5 | 1.0 |      |     | 640 |
| 10 | 0.5 | 1.0 | 0.75 |     | 935 |
| 16 | 0.5 | 0.5 |      | 0.5 | 1,100 |
| 13 | 0.5 | 0.5 | 0.5  | 0.5 | 1,200 |

It is evident from this tabulation that medium No. 12 containing 0.5% corn steep solubles and 1% wheat gluten results in an increase of approximately 55% in streptomycin yield as compared with medium No. 1 wherein 1.5% of corn steep solubles is employed. With medium No. 10, the streptomycin yield is more than twice the yield obtained with medium No. 1, with medium No. 16 the streptomycin yield is still higher, and with medium No. 13 the streptomycin yield is almost three times as great as that obtained with medium No. 1. Thus it is believed that these data demonstrate not only a surprising cooperative or synergistic action in the use of a mixture of corn steep solubles and wheat gluten, but also a further synergistic action when distillers solubles and/or castor bean meal, are incorporated as additional nitrogenous components of the mixture.

Example 2

Using the procedure described in Example 1, a number of experiments were carried out in which medium No. 10 of Example 1 (medium No. 1 below) containing 0.25% NaCl, 2% dextrose, 0.5% corn steep, 0.75% distillers solubles, 1% wheat gluten, and water, was compared with the further preferred medium No. 13 of Example 1 (medium No. 2 below) containing 0.25% NaCl, 2% dextrose, 0.5% corn steep, 0.5% distillers solubles, 0.5% castor bean meal, 0.5% wheat gluten and water. The maximum activities produced were:

| Medium No. 1 | Medium No. 2 |
|---|---|
| U./ml. | U./ml. |
| 1,060 | 1,150 |
| 1,035 | 1,165 |
| 945 | 1,365 |
| 1,050 | 1,130 |
| 1,105 | 1,410 |
| 870 | 1,350 |
| Average: | |
| 1,011 | 1,262 |

It is apparent that medium No. 1 consistently produces high activities and further, that medium No. 2 consistently produces even higher activities, averaging 25% higher than those of medium No. 1.

Example 3

The production of streptomycin in a medium similar to medium No. 10 of Example 1 but containing 2.2% of dextrose was studied in two 200-gallon fermentors to each of which 510 liters of the medium was charged. Each fermentor was sterilized by heating at 120–122° C. for about 30 minutes and was then inoculated with a vegetative culture of a streptomycin-producing strain of *S. griseus*. The fermentors were then maintained at 26–28° C. and the contents were continuously agitated and aerated for 4 days. Samples were taken during this period and assayed by the *B. subtilis* cup assay. The results were as follows:

| Fermentor No. | Time of Maximum Activity | Maximum Activity, u./ml. |
|---|---|---|
|   | Hours |   |
| 1 | 90 | 920 |
| 2 | 80 | 1,060 |

Various changes and modifications may be made in carrying out the present invention without departing from the spirit and scope thereof. Insofar as these changes and modifications are within the purview of the annexed claims, they are to be considered as part of my invention.

I claim:

1. The process for producing streptomycin that comprises fermenting with a streptomycin producing strain of *Streptomyces griseus* a culture medium containing as a source of nitrogen and streptomycin activity factor a mixture comprising corn steep solubles and wheat gluten.

2. The process for producing streptomycin that comprises fermenting with a streptomycin producing strain of *Streptomyces griseus* a culture medium containing as a source of nitrogen and streptomycin activity factor a mixture comprising corn steep solubles, wheat gluten and at least one of the additional nitrogenous materials, distillers solubles and castor bean meal.

3. The process for producing streptomycin that comprises fermenting with a streptomycin producing strain of *Streptomyces griseus* a culture medium containing as a source of nitrogen and streptomycin activity factor a mixture consisting of corn steep solubles, wheat gluten and distillers solubles.

4. The process for producing streptomycin that comprises fermenting with a streptomycin producing strain of *Streptomyces griseus* a culture medium containing as a source of nitrogen and streptomycin activity factor a mixture consisting of corn steep solubles, wheat gluten and castor bean meal.

5. The process for producing streptomycin that comprises fermenting with a streptomycin producing strain of *Streptomyces griseus* a culture medium containing as a source of nitrogen and streptomycin activity factor a mixture consisting of corn steep solubles, wheat gluten, distillers solubles and castor bean meal.

6. The process for producing streptomycin that comprises fermenting with a streptomycin producing strain of *Streptomyces griseus* a culture medium containing as a source of nitrogen and streptomycin activity factor a mixture comprising corn steep solubles and wheat gluten wherein the proportion of wheat gluten is within the range of about 0.5 to 2.0 parts per part of corn steep solubles.

7. The process for producing streptomycin that comprises fermenting with a streptomycin producing strain of *Streptomyces griseus* a culture medium containing as a source of nitrogen and streptomycin activity factor a mixture comprising corn steep solubles and wheat gluten wherein the proportion of wheat gluten is within the range of about 0.5 to 2.0 parts per part of corn steep solubles and the combined weight of the corn steep solubles and wheat gluten is about 1.0% to 2.0% of the medium.

8. The process for producing streptomycin that comprises fermenting with a streptomycin producing strain of *Streptomyces griseus* a culture medium containing as a source of nitrogen and streptomycin activity factor a mixture comprising approximately 0.5 to 1.0% corn steep solubles and 0.5 to 1.0% wheat gluten.

9. The process for producing streptomycin that comprises fermenting with a streptomycin producing strain of *Streptomyces griseus* a culture medium containing as a source of nitrogen and streptomycin activity factor a mixture comprising approximately 0.5–1.0% corn steep solubles, 0.5–1.0% wheat gluten and 0.5–1% of additional nitrogenous material supplied by at least one of the substances, distillers solubles and castor bean meal.

10. The process for producing streptomycin that comprises fermenting with a streptomycin producing strain of *Streptomyces griseus* a culture medium containing as a source of nitrogen and streptomycin activity factor a mixture consisting of approximately 0.5% corn steep solubles, 1.0% wheat gluten, and 0.75% distillers solubles.

11. The process for producing streptomycin that comprises fermenting with a streptomycin producing strain of *Streptomyces griseus* a culture medium containing as a source of nitrogen and streptomycin activity factor a mixture consisting of approximately 0.5% corn steep solubles, 0.5% wheat gluten and 0.5% castor bean meal.

12. The process for producing streptomycin that comprises fermenting with a streptomycin producing strain of *Streptomyces griseus* a culture medium containing as a source of nitrogen and streptomycin activity factor a mixture consisting of approximately 0.5% corn steep solubles, 0.5% wheat gluten, 0.5% distillers solubles, and 0.5% castor bean meal.

13. The process for producing streptomycin that comprises fermenting with a streptomycin producing strain of *Streptomyces griseus* a culture medium containing a carbohydrate, inorganic salt, and a source of nitrogen and streptomycin activity factor comprising a mixture of corn steep solubles and wheat gluten.

14. The process for producing streptomycin that comprises fermenting with a streptomycin producing strain of *Streptomyces griseus* a culture medium containing a carbohydrate, inorganic salt, and a source of nitrogen and streptomycin activity factor comprising a mixture of corn steep solubles, wheat gluten and at least one of the additional nitrogenous materials, distillers solubles and castor bean meal.

15. The process for producing streptomycin that comprises fermenting with a streptomycin producing strain of *Streptomyces griseus* a culture medium containing a carbohydrate, inorganic salt, and a source of nitrogen and streptomycin activity factor consisting of a mixture of corn steep solubles, wheat gluten and distillers solubles.

16. The process for producing streptomycin that comprises fermenting with a streptomycin producing strain of *Streptomyces griseus* a culture medium containing a carbohydrate, inorganic salt, and a source of nitrogen and streptomycin activity factor consisting of a mixture of corn steep solubles, wheat gluten and castor bean meal.

17. The process for producing streptomycin that comprises fermenting with a streptomycin producing strain of *Streptomyces griseus* a culture medium containing a carbohydrate, inorganic salt, and a source of nitrogen and streptomycin activity factor consisting of a mixture of corn steep solubles, wheat gluten, distillers solubles, and castor bean meal.

18. The process for producing streptomycin that comprises fermenting with a streptomycin producing strain of *Streptomyces griseus* a culture medium containing approximately 2.0% of dextrose, 0.25% of sodium chloride and a source of nitrogen and streptomycin activity factor comprising a mixture of 0.5–1.0% of corn steep solubles and 0.5–1.0% of wheat gluten.

19. The process for producing streptomycin that comprises fermenting with a streptomycin producing strain of *Streptomyces griseus* a culture medium containing approximately 2.0% of dextrose, 0.25% of sodium chloride and a source of nitrogen and streptomycin activity factor comprising a mixture of 0.5-1.0% of corn steep solubles, 0.5-1% of wheat gluten, and 0.5-1.0% of additional nitrogenous material supplied by at least one of the substances, distillers solubles and castor bean meal.

THOMAS D. NUNHEIMER.

REFERENCES CITED

The following references are of record in the file of this patent:

UNITED STATES PATENTS

| Number | Name | Date |
|---|---|---|
| 1,035,591 | Ikeda | Aug. 13, 1912 |
| 2,516,682 | Donovick et al. | July 25, 1950 |
| 2,538,942 | McDaniel | Jan. 23, 1951 |
| 2,541,726 | Trussell | Feb. 13, 1951 |

OTHER REFERENCES

Rao, Nature, Nov. 20, 1948, page 820.